United States Patent [19]
Mai et al.

[11] Patent Number: 6,145,035
[45] Date of Patent: *Nov. 7, 2000

[54] CARD CRADLE SYSTEM AND METHOD

[75] Inventors: Chao C. Mai; Francis A. Scherpenberg; Titkuan Hui; Wayne Mendenhall, all of Dallas, Tex.

[73] Assignee: Dallas Semiconductor Corporation, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/257,812

[22] Filed: Feb. 25, 1999

[51] Int. Cl.$^7$ .................................................. G06F 13/00
[52] U.S. Cl. ................... 710/62; 710/102; 340/825.34; 705/41; 235/382
[58] Field of Search ........... 713/200; 340/825.31, 340/825.34; 710/62, 102; 386/52; 705/41; 235/379–382

[56] References Cited

U.S. PATENT DOCUMENTS

| | | | |
|---|---|---|---|
| 5,159,182 | 10/1992 | Eisele | 235/492 |
| 5,204,663 | 4/1993 | Lee | 340/825.34 |
| 5,265,164 | 11/1993 | Matyas et al. | 380/30 |
| 5,276,317 | 1/1994 | Ozouf et al. | 235/486 |
| 5,406,630 | 4/1995 | Piosenka et al. | 380/52 |
| 5,450,491 | 9/1995 | McNair | 380/25 |
| 5,500,517 | 3/1996 | Cagliostro | 235/486 |
| 5,510,074 | 4/1996 | Rose | 264/261 |
| 5,533,123 | 7/1996 | Force et al. | 380/4 |
| 5,541,583 | 7/1996 | Mandelbaum | 340/825.54 |
| 5,552,776 | 9/1996 | Wade et al. | 340/825.31 |
| 5,584,043 | 12/1996 | Burkart | 710/62 |
| 5,644,118 | 7/1997 | Hayashida | 235/379 |
| 5,663,553 | 9/1997 | Aucsmith | 235/492 |
| 5,719,437 | 2/1998 | Clifton et al. | 257/679 |
| 5,748,737 | 5/1998 | Daggar | 380/24 |
| 5,818,345 | 10/1998 | Sjooquist | 340/825.31 |
| 5,845,066 | 12/1998 | Fukuzumi | 713/200 |
| 5,848,298 | 12/1998 | Steere, Jr. et al. | 710/62 |
| 5,895,906 | 4/1999 | Danielson et al. | 235/462.27 |
| 5,933,498 | 8/1999 | Schneck et al. | 380/4 |
| 5,988,510 | 11/1999 | Tuttle et al. | 235/492 |

OTHER PUBLICATIONS

"IBM Smart Card Solutions"; IBM Smart Card Solution Elements—Technical Overview—Chapter 2; pp. 1–16; Internet from http://www.chipcard.ibm.com/overview/sc_2.htm.

*About Smart Cards; Frequently Asked Questions*, pp. 1–4 (Internet from Smart Card Industry Association; 1998–1999).

*Primary Examiner*—Paul R. Myers
*Attorney, Agent, or Firm*—Jenkens & Gilchrist

[57] ABSTRACT

A system comprising a card device for effectuating a transaction when presented to a transaction terminal, the card device including a memory and a first energy source, the source for powering the memory for a period of time, and a card cradle carrier for storing the card device when the card device is not engaged in the transaction. The card cradle carrier is formed of a substantially rigid material and forms at least a portion of a personal effect. In accordance with the teachings of the present invention, the card cradle carrier includes a second energy source for recharging the first energy source when the card device is received for storage by the card cradle carrier.

25 Claims, 8 Drawing Sheets

CARD CRADLE SYSTEM AND METHOD

BACKGROUND OF THE INVENTION

1. Technical Field of the Invention

The present invention relates to card-based transaction systems. More particularly, and not by way of any limitation, the present invention relates to volatile-memory based cards and storage receptacles therefor.

2. Description of Related Art

The use of information bearing cards having electronic circuitry thereon (also known as "Smart Cards") has been proliferating in a variety of fields, for example, financial services, point-of-sale transaction applications, prepaid phone/information access services, toll collection applications, health care services, et cetera. To promote uniformity and cross-platform compatibility, standards have emerged in the industry regarding various aspects of the cards such as, for example, physical characteristics, communication protocols and so forth.

Advances in Very Large Scale Integration (VLSI) techniques of integrated circuit (IC) design and semiconductor manufacturing have made it possible to incorporate additional functionality in the microchips or ICs that are embedded in the card substrates. Further, because of the increased use of highly sensitive information in these cards, the need for information security has dramatically increased.

Existing smart cards typically provide information security by utilizing known cryptographic methods and algorithms. The encryption and decryption key variables and other sensitive information inputs used in these methods are typically provided in Electrically Erasable and Programmable Read-Only Memory (EEPROM) storage on the card. Dedicated processors or cryptographic engines are also provided on the card sometimes to optimize computational load.

Current smart card solutions, with or without information security, have several deficiencies and shortcomings. For example, existing smart cards may fail when, due to applied mechanical stress, the rigid semiconductor die or chip of the card breaks. It can be readily appreciated that mechanical stress is inherent in most typical smart card storage environments, i.e., cardholder's personal effects such as wallets, pockets, purses, et cetera.

Where information security is provided based on nonvolatile storage, there is a possibility that the card's IC may be microprobed by unauthorized persons to determine the charge state of individual memory cells and thereby gather sensitive information stored therein. Clearly, such a possibility, however remote, cannot be tolerated in numerous applications. Yet another detrimental possibility exists where a transaction is conducted by the legitimate cardholder but under a threat from an unauthorized person.

Accordingly, it should be readily appreciated by those skilled in the art that although there exist several single chip secure cards today, no one card system addresses these and other deficiencies and shortcomings by providing all of the innovative and advantageous features of the present invention described and claimed hereinbelow.

SUMMARY OF THE INVENTION

The present invention advantageously provides a system comprising: a card device for effectuating a transaction when presented to a transaction terminal, the card device including a memory and a first energy or power source, the source for powering the memory for a period of time; and a card cradle carrier for storing the card device when the card device is not engaged in the transaction, the card cradle carrier formed of a substantially rigid material and forming at least a portion of a personal effect. In accordance with the teachings of the present invention, the card cradle carrier includes a second energy or power source for recharging the first energy source when the card device is received for storage by the card cradle carrier.

In one aspect, the present invention is directed to a smart card device capable of storage in a cradle, the cradle including a primary power source, the smart card device comprising: a circuit for effectuating a cryptographic function in connection with a transaction when the smart card device is presented to a transaction terminal, the circuit including a static random access memory (SRAM) unit; and a backup power source for powering the SRAM unit when the smart card device is out of the cradle and not powered by the transaction terminal.

In a further aspect, the present invention relates to a card cradle comprising: a receptacle for accepting a card for storage, the card including a first energy or power source for powering a memory disposed on the card when the card is removed from the card cradle; and a second energy or power source for charging the first energy source when the card is received by the receptacle.

In a yet another aspect, the present invention is directed to a method for providing information security on a card comprising an integrated circuit (IC), wherein the card is stored in a cradle when not in use. The method comprises the steps of: providing a volatile storage unit on the card for storing cryptographic information; providing a backup power source on the card for powering the volatile storage unit when the card is removed from the cradle to effectuate a transaction at a terminal; providing parasitic power to recharge the backup power source from the terminal when the card is presented to the terminal; and providing a primary power source associated with the cradle for charging the backup power source when the card is repositioned in the cradle.

BRIEF DESCRIPTION OF THE DRAWINGS

A more complete understanding of the system and method of the present invention may be had by reference to the following Detailed Description when taken in conjunction with the accompanying Drawings, wherein.

DETAILED DESCRIPTION OF THE DRAWINGS

Figure 1:
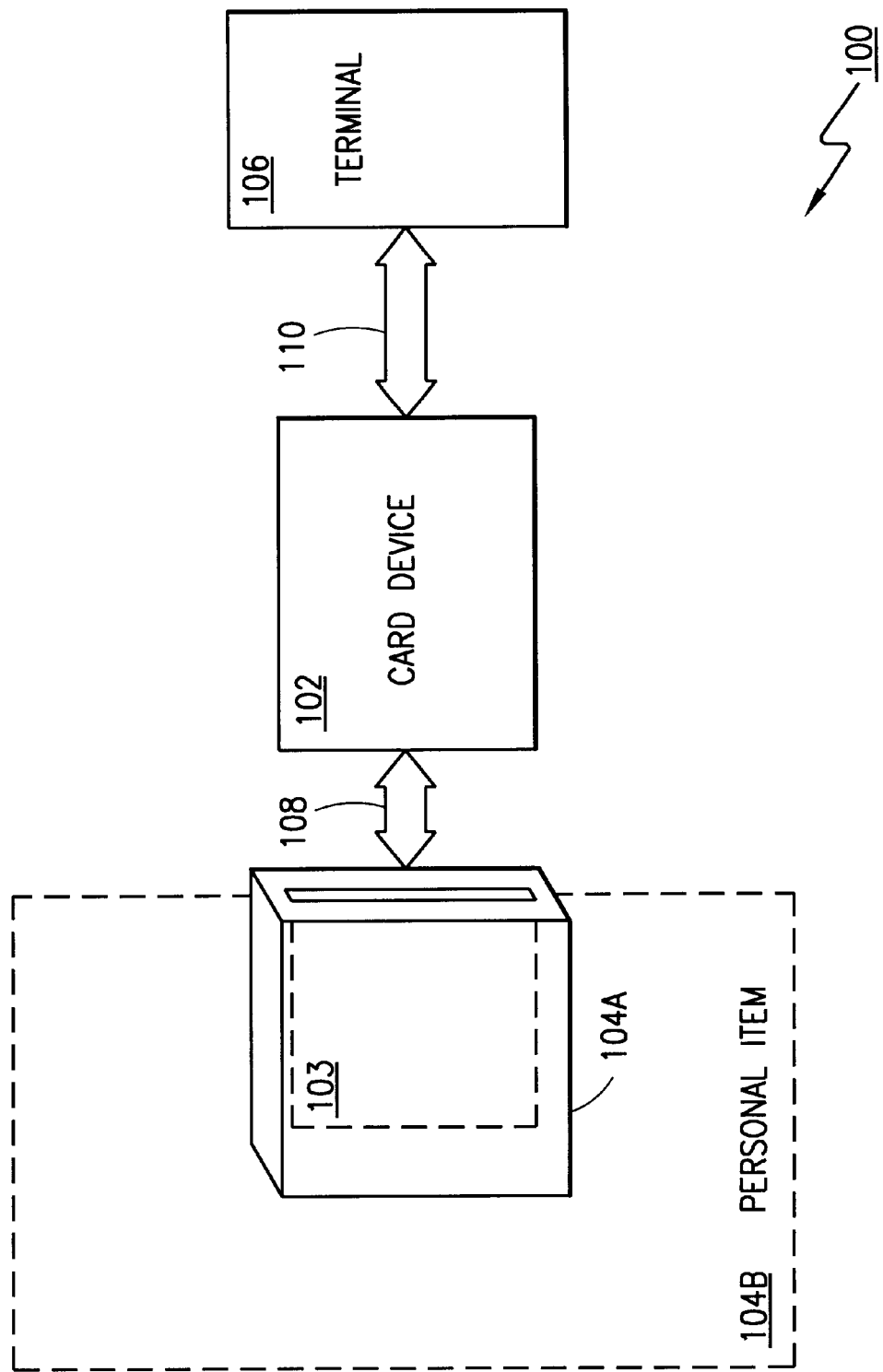
FIG. 1 depicts a functional block diagram of an exemplary transaction system provided in accordance with the teachings of the present invention.

Referring now to the Drawings wherein like or similar elements are designated with identical reference numerals throughout the several views, and wherein the various elements depicted are not necessarily drawn to scale, and more particularly to FIG. 1, shown therein is a functional block diagram of an exemplary transaction system 100 provided in accordance with the teachings of the present invention. A card device (or, synonymously a card) 102, preferably of the type in compliance with the existing "Smart Card" specifications, is provided to be operable with a card cradle carrier 104A as will be described in greater detail hereinbelow. The card device 102 contains a microchip module (or, an integrated circuit (IC) module) (not shown) embedded in a cavity therein. Further, the IC module of the card device 102 may preferably be provided with the following properties including, without limitation: (i) advanced Very Large Scale Integration (VLSI) for enhanced functionality; (ii) high levels of security against a broad range of threats, including fraud, accidental errors and failure through degradation; (iii) easy programmability and application downloading capability; (iv) ability to process different kinds of information relating to a cardholder, e.g, financial information, health and other personal information, event information, value information, etc., and (v) capability to adapt to new and innovative methodologies for fast development and deployment of security certification functions.

Depending upon a particular application in which the exemplary transaction system 100 is deployed, the card device 102 is preferably provided to be compliant with one or more of the existing International Standards Organization (ISO) standards, European Standards (CEN) and other industry standards including, without limitation, the "Europay, Mastercard and Visa" (EMV) standard, OpenCard Framework standards, JavaCard specifications, et cetera. Some of the exemplary ISO standards are as following: ISO 7816-1 (Physical Characteristics of cards); ISO 7816-2 (Position of IC module and contacts on cards); ISO 7816-3 (Exchange protocol with cards, that is, communication between readers and cards) and ISO 7816-4 (Command set for microprocessor cards).

Continuing to refer to FIG. 1, although in some applications the card 102 may be provided with a set of contacts (not shown in this FIG.) for communication with a terminal 106, it should be understood that contactless communication therebetween is also contemplated herein. A communication path 110, accordingly, comprehends all types of communication, with or without contacts, between the card 102 and the transactional terminal 106 which can be a point-of-sale terminal, electronic cash machine, Internet-based e-commerce transaction site, or an application-specific card reader. The Card 102, accordingly, can accommodate a variety of uses that allow a cardholder to make purchases from a credit account, debit account, or stored value on the card, in addition to deploying multiple applications on the same card. Some of the exemplary applications can include, for example, frequent flyer programs from airlines; frequency or loyalty programs with merchants, including hotel and rental car reservation preferences; public transport- or mass transport-related toll collections; pre-paid phone services, et cetera.

Still continuing to refer to FIG. 1, the card cradle carrier 104A includes a receptacle 103 that is preferably dimensioned to receive and store the card 102 when it is not in use. The card cradle 104A is also preferably formed of a substantially rigid material such that mechanical stresses applied on a card in typical cardholder-environments are substantially reduced. Further, in accordance with the teachings of the present invention described in greater detail hereinbelow, the card device 102 is provided to be in an electrical conductive relationship 108 with the circuitry of the cradle 104A (not shown) when the card is stored in the receptacle 103 therein. In addition, the card cradle carrier 104A may preferably be provided as a portion of a cardholder's personal effects 104B such as, for example, a bill-fold, wallet, purse, bag, pouch, briefcase or a pocket and the like.

Figure 2:
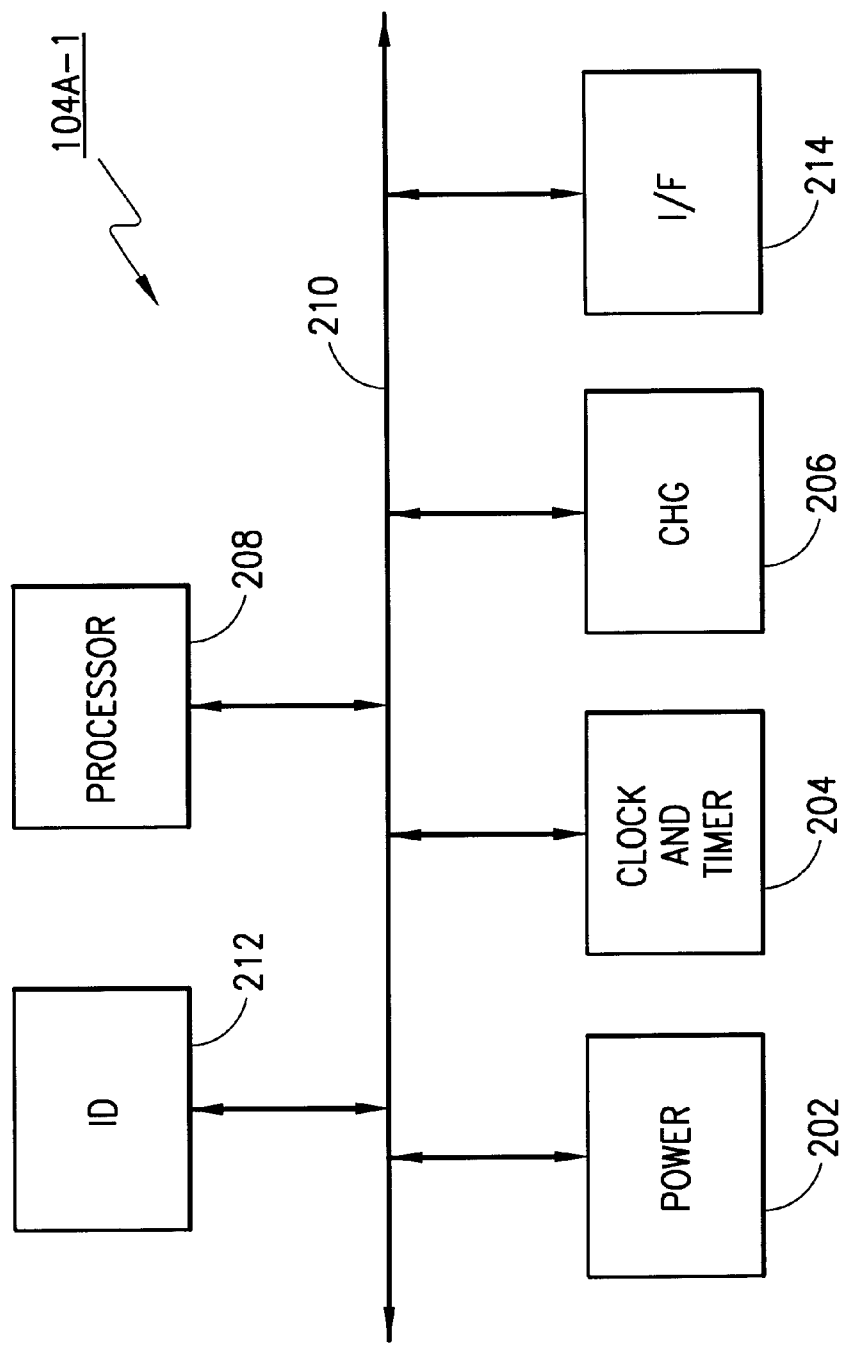
FIG. 2 depicts a functional block diagram of a card cradle carrier relating to its electrical circuitry in one embodiment.

Referring now to FIG. 2, a functional block diagram of the electrical circuitry of the card cradle carrier 104A is shown in one embodiment, generally at 104A-1. A conductive path 210 interconnects the various components of the electrical circuitry 104A-1. A primary power/energy source or battery 202 is provided to power the circuitry 104A-1. In addition, the power source 202 powers the circuitry of the card device 102 when the card is stored in the receptacle 103 of the cradle 104A (shown in FIG. 1). The power source 202 can comprise conventional devices such as, for example, Lithium (Li) Ion battery cells or Nickel Metal Hydride (NiMH) cells.

A clock/timer block 204 is preferably provided as a tamper-evident "true time" clock that is set by a trusted agent. "True time", which cannot be reset and is forever increasing, can be used to time-stamp transactions, to impose expiration dates and for other chronological information relating to transactions, events, et cetera. A charging block 206 is provided for charging another power source on the card 102, which power/energy source may be transient, when the card is placed in the card cradle 104A.

Continuing to refer to FIG. 2, an identification (ID) block 212 is also coupled to the conductive path 210 for verifying a match between the card device 102 and its cradle carrier 104A. Preferably, a one-to-one unique correspondence may be provided between a card and its cradle so that a mis-matched card will not be identified or powered by the cradle carrier. A processor or controller 208 is provided to control the various operations relating to the circuitry 104A-1 and signal and/or power transmission between the card 102 and its cradle 104 via an interface block 214.

Figure 3:
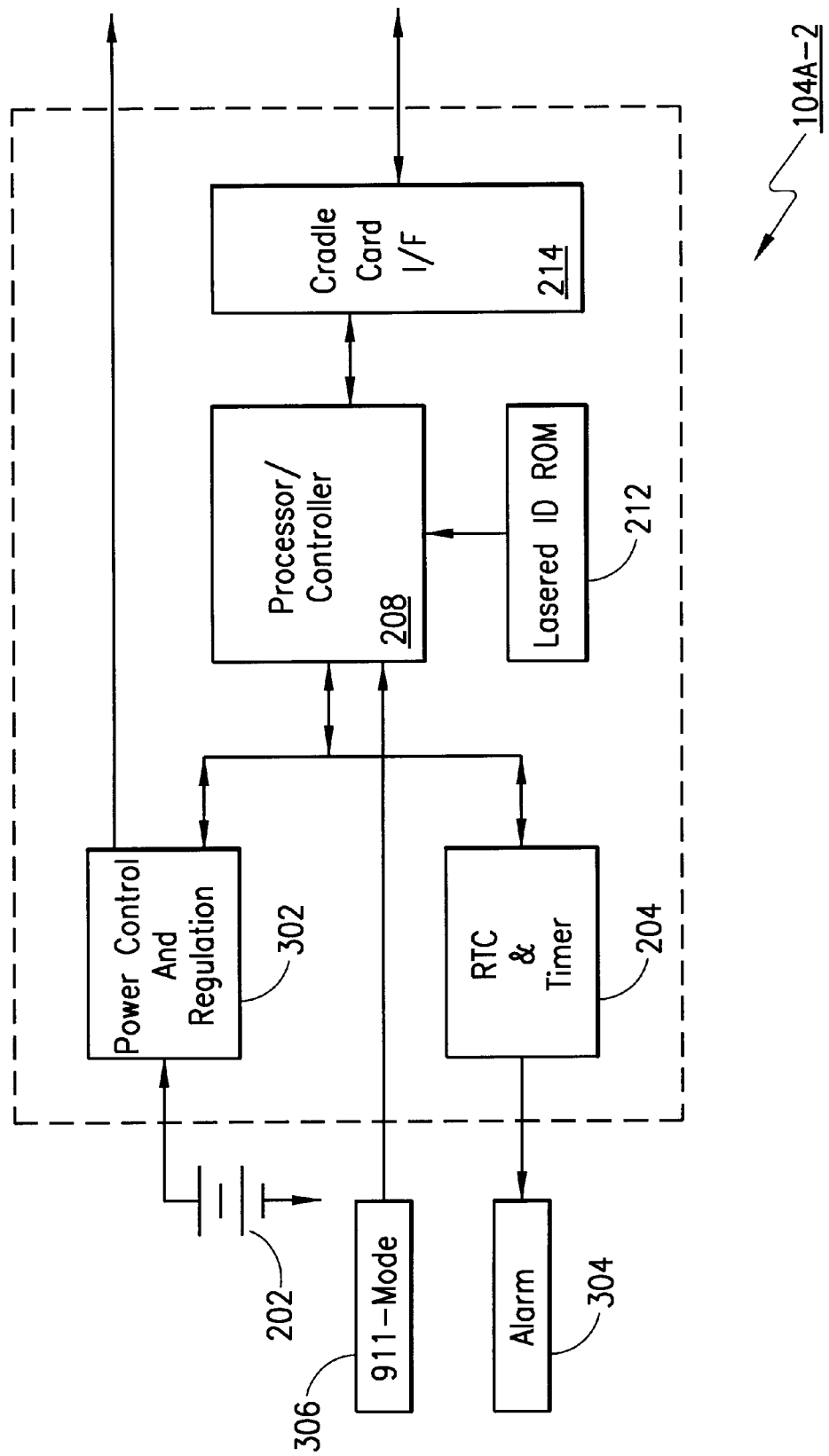
FIG. 3 illustrates a functional block diagram of the card cradle carrier circuitry in another exemplary embodiment.

Another embodiment of the cradle circuitry, generally at 104A-2, is depicted as a functional block diagram in FIG. 3. The ID block 212 is preferably provided as a lasered ID read-only memory (ROM) block containing unique card identification information for facilitating the card-cradle recognition process. A power control/regulation block 302 is coupled to the cradle power source 202. The clock/timer block 204 and cradle/card interface 214 are also provided as described hereinabove in reference to FIG. 2. An alarm indication block 304 is coupled to the clock/timer block 204 for generating an alarm indication when the card device 102 is removed from the card cradle carrier 104A for more than a pre-determined time duration. The alarm indication can comprise vibrational, electronic, radio wave, visual, audio or audio-visual indications and the like. The alarm indication block 304 may also be activated when the card 102 is incorrectly inserted into the receptacle 103 of the card cradle 104A.

In accordance with the teachings of the present invention, an added security feature 306 (hereinafter referred to as the "panic mode" feature or "911-mode" feature) may be provided in an exemplary transaction system such as the system 100 depicted in FIG. 1. The panic mode feature 306 allows a cardholder to enter coded information easily and without substantial deliberation during a transaction under threat or duress (for example, at gunpoint) while the transaction itself is allowed to proceed. When the panic mode feature 306 is activated by the cardholder, the card device 102 is provided with the capability to send the coded information to a host that recognizes the transaction under duress and initiates an appropriate action, for example, activating a security alert, etc. The panic mode feature 306 may preferably communicate with the controller 208 of the cradle circuitry 104A-2 also.

Figure 4:
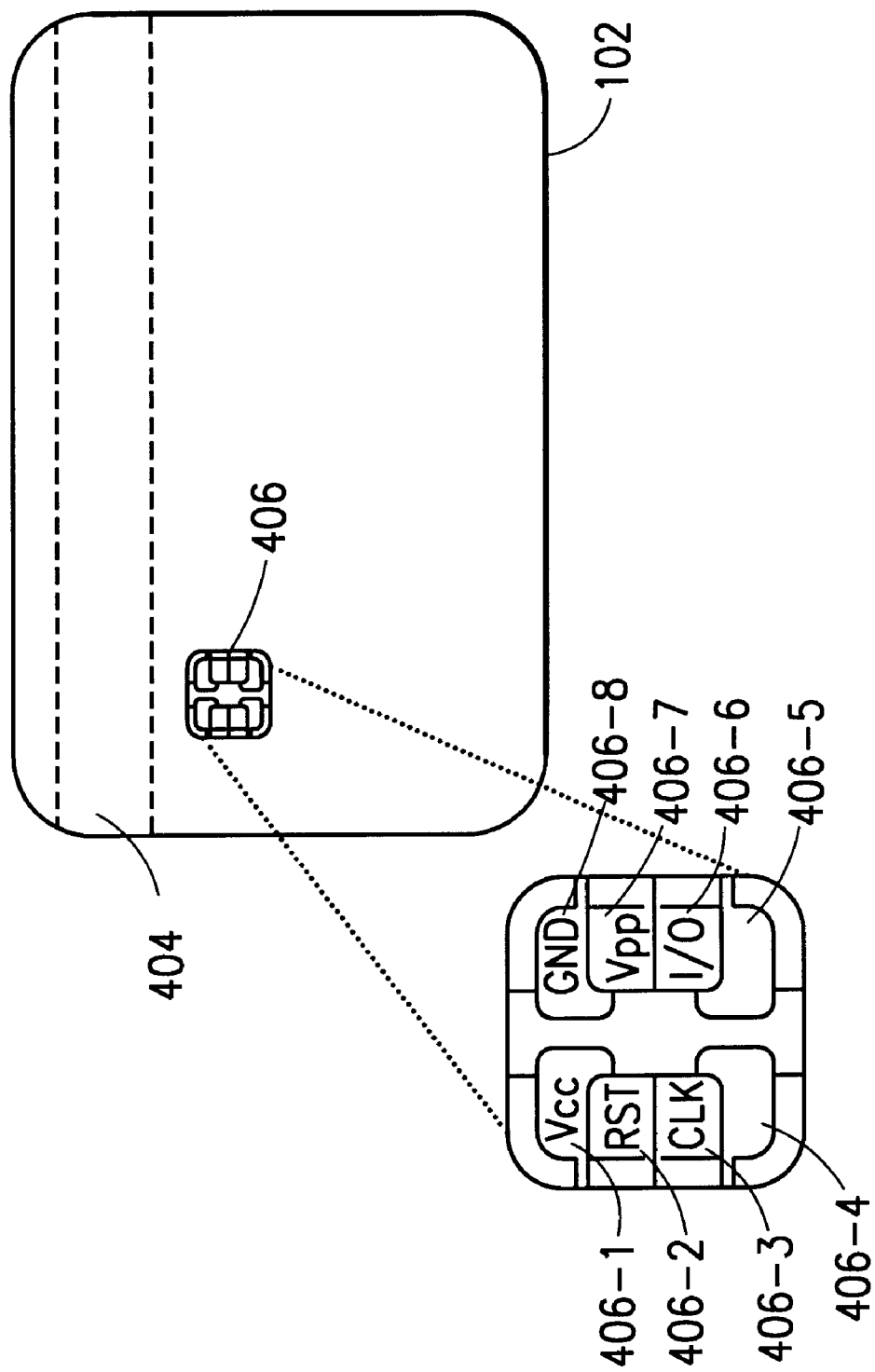
FIG. 4 shows an embodiment of a card for use with the card cradle in accordance with the teachings of the present invention.

Referring now to FIG. 4, an exemplary physical embodiment of the card device 102 is shown. A conventional magnetic strip 404 may be provided on one side of the body of the card 102. A set of contacts 406 may also be provided in accordance with the applicable ISO standards for contact placement. The contacts 406 preferably comprise a VCC contact 406-1, a reset contact 406-2, a clock signal contact 406-3, a pair of Reserved for Future Use (RFU) contacts 406-4 and 406-5, an Input/Output (I/O data) contact 406-6, a VPP contact 406-7 and a ground contact 406-8.

Figure 5:
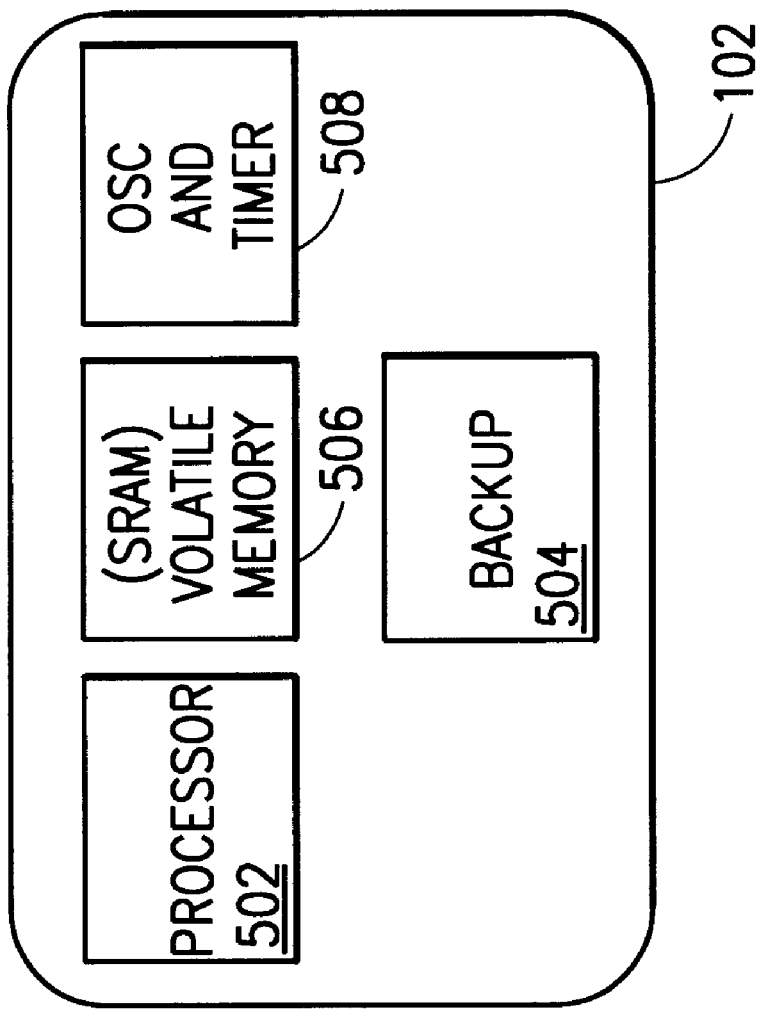
FIG. 5 shows an embodiment of electrical circuitry disposed on a card.

Referring now to FIG. 5, an exemplary embodiment of the card device 102 is shown with its electrical circuitry components. A processor 502, a backup power/energy source 504, a static random access memory (SRAM) unit 506 and a timer 508 are depicted. The backup source 504 is preferably a capacitive element that comprises at least a portion of the body of the card 102. In accordance with the teachings of the present invention, when the card 102 is properly placed in the receptacle 103 of the cradle carrier 104A (shown in FIG. 1), the backup source 504 is charged to its capacity. Also, during the card's storage in the receptacle, the SRAM unit 506 is rendered non-volatile by the power source of the cradle. When the card 102 is pulled out of the cradle 104A for any reason (for conducting a transaction, for example), the SRAM unit 506 is powered by the backup 504 for a select period of time, preferably until the card 102 is presented to a host terminal 106. At that time, the backup 504 is parasitically charged again using the power of the terminal 106 which also powers the transaction process. The timer block 508 is provided to facilitate these and other time-dependent activities of the card circuitry. For example, after a pre-determined period of time, the contents of the SRAM unit 506 can be rapidly erased without leaving any trace of the prior charge state (indicative of the sensitive information previously stored) of the SRAM cells. Those of ordinary skill in the art should appreciate that this rapid erasing (sometimes referred to as "zeroization") of the SRAM unit containing security information, encryption/decryption keys or other important information provides a high level of security. It should also be appreciated that providing SRAM-based storage on the card in accordance with the teachings of the present invention is significantly more advantageous than providing conventional Electrically Erasable and Programmable Read-Only Memory (EEPROM) for key information because of the ease of rapid erasing with no traces of prior charge condition.

Further, the SRAM unit 506 of the card 102 may be rapidly erased by using a combination method involving both time and charge level of the backup power source 504. Also, by providing physical barriers (such as fine-pitch conductive grids or serpentines, intrusion detectors, etc) within the body of the card 102, the contents of the SRAM unit may be rendered additionally secure, which contents will be quickly erased upon the detection of a breach.

Figure 6:
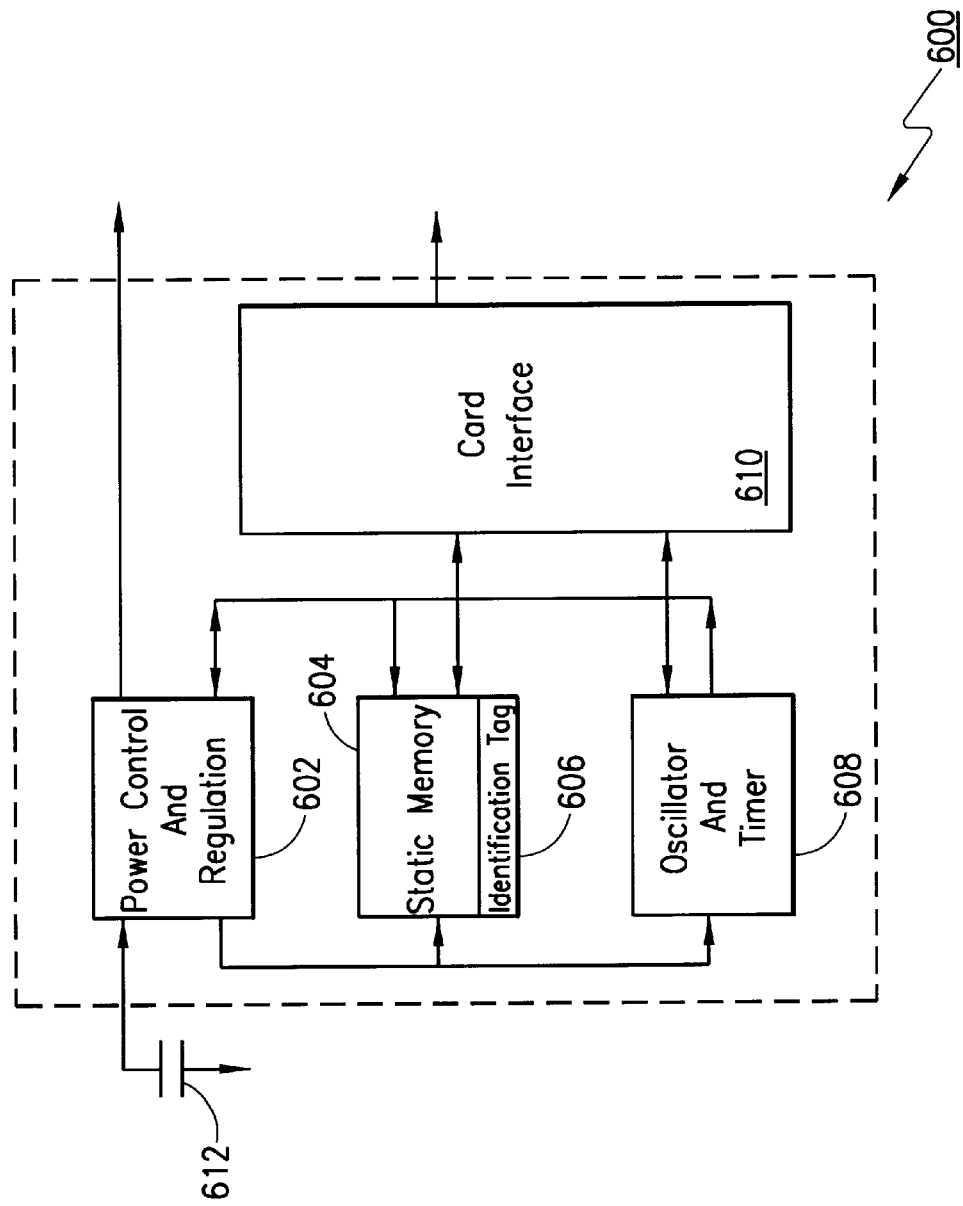
FIG. 6 depicts a functional block diagram of a card relating to its electrical circuitry in one embodiment.

Referring now to FIG. 6, an embodiment of the card electrical circuitry is shown, generally at 600, as a functional block diagram. A capacitor 612 is coupled to a power control/regulation block 602 which provides power to a static memory 604, an oscillator/timer 608 and a suitable card interface 610. An identification tag 606 is provided with the static memory 604 in order to facilitate ID recognition process between the card 102 and its cradle carrier 103.

Figure 7:
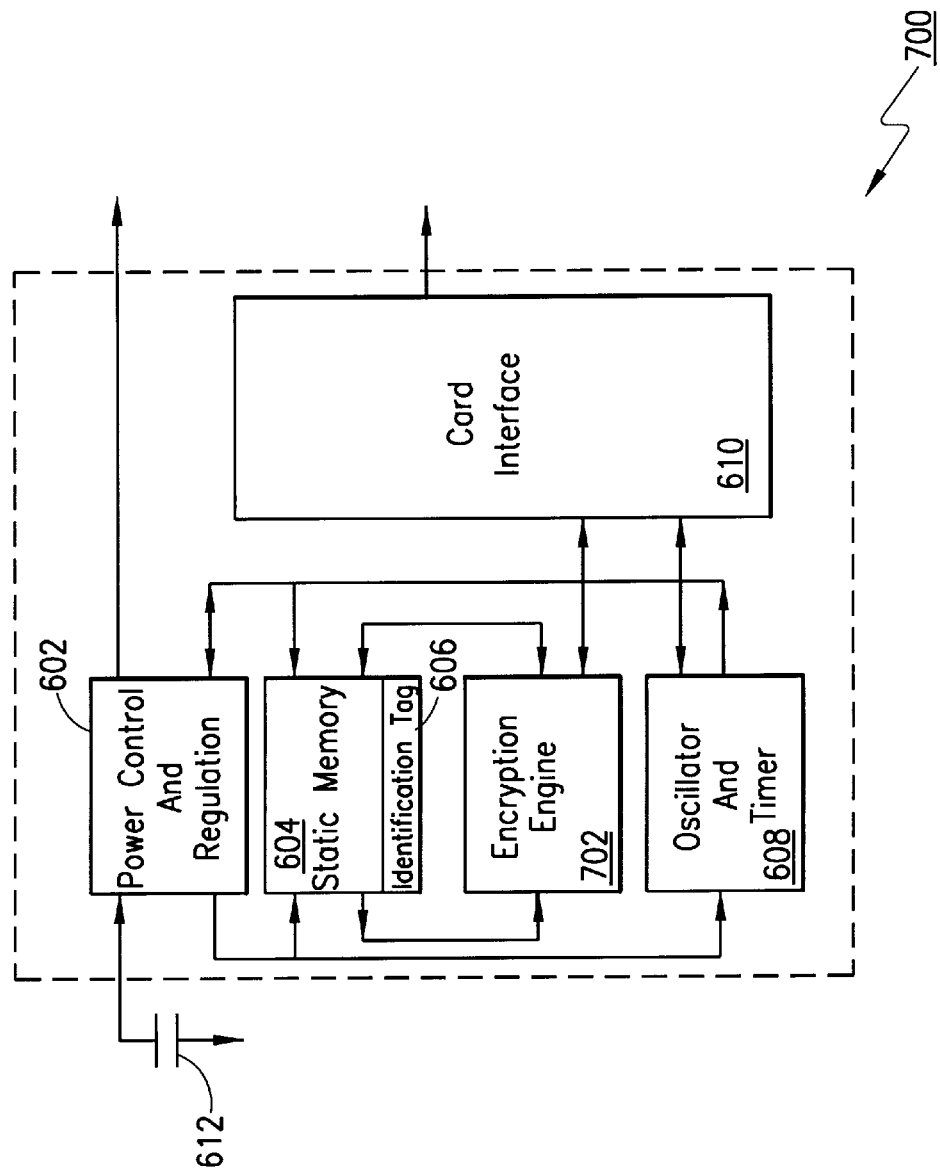
FIG. 7 depicts a functional block diagram of a card relating to its electrical circuitry in another exemplary embodiment.

Another embodiment of the card circuitry, generally at 700, is shown as a functional block diagram in FIG. 7. An encryption engine 702 is provided as part of the circuitry 700 that is adapted for cryptographic functions. The cryptographic engine 702 may preferably comprise circuitry to perform one or more of known private- and public-key cryptographic methods or algorithms. Exemplary cryptographic methods and services include, without limitation, Diffie-Hellman algorithms, Rivest-Shamir-Adelman (RSA) methods, hashing schemes, single- and triple- Data Encryption Standard (DES) algorithms, digital certificates and signatures, authentication services and the like.

Figure 8:
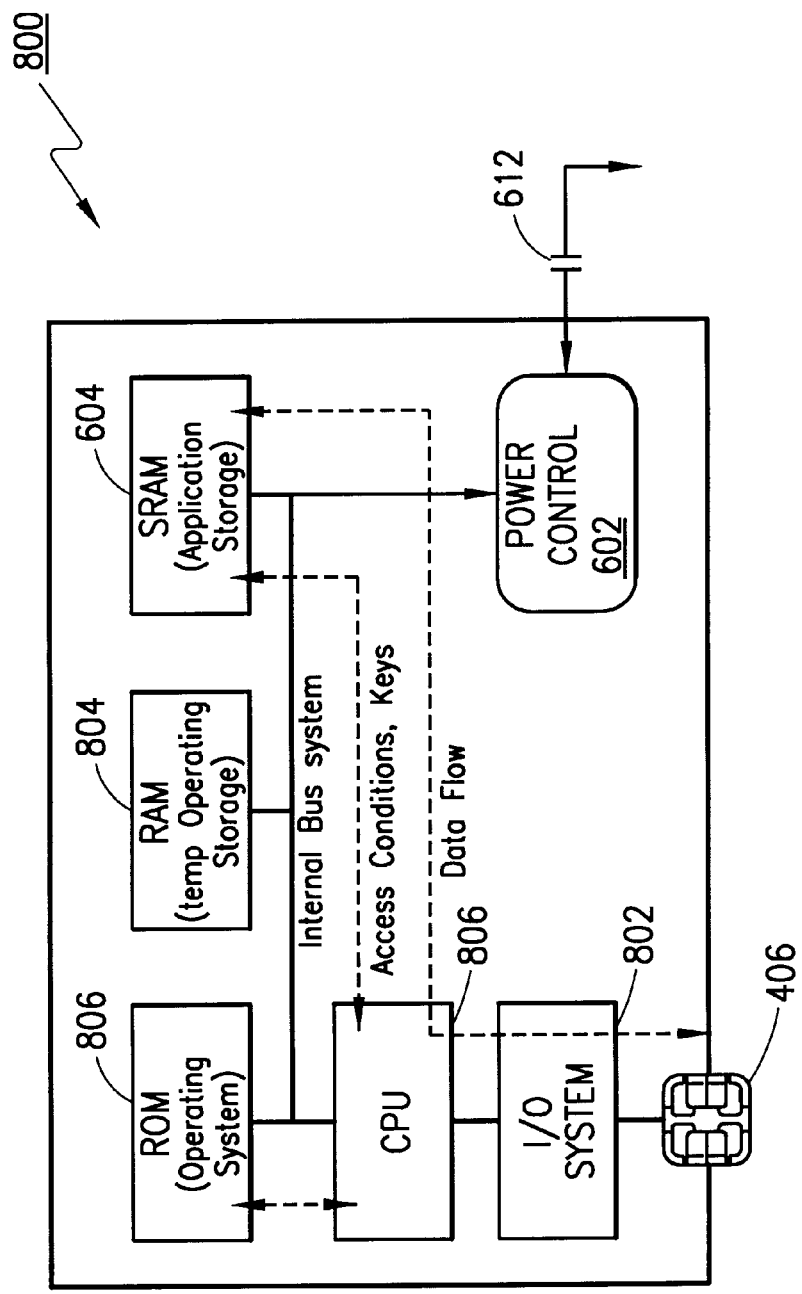
FIG. 8 depicts a functional block diagram of a card relating to its electrical circuitry in a still further exemplary embodiment.

Yet another embodiment of the card circuitry, generally at 800, is shown as a functional block diagram in FIG. 8 that is also adapted for cryptographic functionality. A ROM block 806 is provided for storing an operating system for a CPU 806 that is interfaced with a RAM 804, static memory 604 and an I/O system 802. The I/O system 802 is coupled to the contact set 406 described in reference to FIG. 4.

Based upon the foregoing Detailed Description, it should now be appreciated by those skilled in the art that the present invention provides an intelligent cradle carrier system for a card that is optimized for high level of security, encryption and versatility. The mechanical stress related problems encountered in typical operational environments by current cards are solved by providing a substantially rigid cradle, either separately or as a portion of a personal item. The versatility of static-memory based storage of encryption data on the card is achieved by providing a rechargeable backup source thereon that powers the data when the card is in transit between the intelligent cradle and a transaction terminal. Additional security features like timed erasing of data, alarm indication capability, panic mode capability, et cetera, enhance the functionality of current card systems while maintaining the form-fit-function compliance with existing standards.

Although only certain preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, the teachings of the present invention can be practiced in any card environment including, without limitation, JavaCards, contactless cards, hybrid cards having contacts-based and contactless communications, cards with multimedia interfaces, et cetera. Further, it should be appreciated that the present invention is not limited to only certain types of existing ISO standards but contemplates practice with other current and future card standards as well.

Although the use of a single volatile memory unit is described herein for the purpose of storing sensitive information, one of ordinary skill in the art can readily understand that the volatile memory can be provided in any combination of constituent elements with a variety of organizational schemes. Furthermore, any memory that can be powered by a backup power source within the card is contemplated to be within the ambit of the present invention.

All these and other numerous rearrangements, modifications, extensions, et cetera, are comprehended to comprise the teachings of the present invention whose scope is solely as set forth and defined by the following claims.

What is claimed is:

1. A system, comprising:
   a card device for effectuating a transaction when presented to a transaction terminal, said card device including a SRAM memory and a rechargeable energy source, said source for powering said memory being only of a size sufficient to power said card device for a limited period of time;
   a card cradle carrier for storing said card device when said card device is not engaged in said transaction, said card cradle carrier formed of a substantially rigid material and forming at least a portion of a personal effect, wherein said card cradle carrier includes a second energy source for recharging said rechargeable energy source when said card device is received for storage by said card cradle carrier and further wherein said card cradle further includes a lasered read-only memory (ROM) identification block; and
   means for rapidly zeroization of said SRAM unit after a select period of time has elapsed between removal of said card from said cradle without engaging said card in a transaction as determined by a true-time non-resettable clock.

2. The system as set forth in claim 1, wherein said first energy source comprises a capacitor.

3. The system as set forth in claim 1, wherein said card device further includes control means for turning power off from said first energy source after a select time interval is elapsed.

4. The system as set forth in claim 1, wherein said card cradle carrier further includes:
   a power control and regulation module coupled to said second energy source;
   a real-time-clock and timer module coupled to said power control and regulation module;
   a card interface module for coupling with said card device when said card device is received by said card cradle carrier;
   a controller coupled to each of said real-time-clock and timer module said power control and regulation module and said card interface module for controlling signal communication therebetween; and
   wherein said lasered read-only memory (ROM) identification block coupled to said controller is for identifying said card device when presented to said card cradle carrier for storage.

5. The system as set forth in claim 4, wherein said second energy source comprises at least one Lithium (Li) Ion cell.

6. The system as set forth in claim 4, wherein said second energy source comprises at least one Nickel Metal Hydride (NiMH) cell.

7. The system as set forth in claim 4, wherein said card cradle carrier further comprises alarm means for generating an alarm when said card device is removed from said card cradle carrier for more than a pre-determined time duration.

8. The system as set forth in claim 7, wherein said alarm comprises an audible indication.

9. The system as set forth in claim 7, wherein said alarm comprises a visible indication.

10. The system as set forth in claim 1, wherein said personal effect comprises a wallet.

11. The system as set forth in claim 1, wherein said personal effect comprises a purse.

12. The system as set forth in claim 1, wherein said personal effect comprises a handbag.

13. The system as set forth in claim 1, wherein said personal effect comprises a pouch.

14. The system as set forth in claim 1, wherein said personal effect comprises a briefcase.

15. A smart card device capable of storage in a cradle, said cradle including a primary power source, said smart card device comprising:
   a circuit for effectuating a cryptographic function in connection with a transaction when said smart card device is presented to a transaction terminal, said circuit including a static random access memory (SRAM) unit;
   a rechargeable backup power source having a limited amount of energy storage therein, such that said limited amount of energy that is stored is capable of powering said SRAM unit for only a limited period of time when said smart card device is out of said cradle and not powered by said transaction terminal;
   means for rapidly zeroization of said SRAM unit after a select period of time has elapsed between removal of said card from said cradle without engaging said card in a transaction;
   means to read a lasered read-only memory (ROM) identification block wherein said smart card has an ISO 7816 form factor.

16. The smart card device as set forth in claim 15, further including means for charging said backup power when said smart card device is powered by said transaction terminal.

17. The smart card device as set forth in claim 15, wherein said circuit comprises a symmetric-key cryptographic engine.

18. The smart card device as set forth in claim 15, wherein said circuit comprises an asymmetric-key cryptographic engine.

19. The smart card device as set forth in claim 15, further including oscillator and timer means coupled to an interface, said interface providing a signal communication path with said transaction terminal.

20. The smart card device as set forth in claim 19, wherein said interface comprises a standardized interface unit.

21. A card cradle, comprising:
   a receptacle for accepting a ISO 7816 form factor card for storage, wherein said card includes a rechargeable energy source for powering a memory disposed on said card when said card is removed from said card cradle only for a short duration of time;
   a second energy source for re-charging said first energy source when said card is received by said receptacle, and
   a power control and regulation module coupled to said second energy source;
   a real-time-clock and timer module coupled to said power control and regulation module;
   a card interface module for coupling with said card when said card is received by said receptacle;
   a controller coupled to each of said real-time-clock and timer module, said power control and regulation module and said card interface module for controlling signal communication therebetween; and
   a lasered read-only memory (ROM) identification block coupled to said controller for identifying said card when presented to said card cradle for storage.

22. The card cradle as set forth in claim 21, further comprising means for generating an alarm when said card is removed from said card cradle for more than a select time period.

23. The card cradle as set forth in claim 21, further comprising means for receiving a panic mode indication from said card.

24. A method for providing information security on an ISO 7816 form factor card comprising an integrated circuit (IC), wherein said card is stored in a cradle when not in use, comprising the steps of:

providing a volatile storage unit on said card for storing cryptographic information;

providing a rechargeable power source on said card for powering said volatile storage unit when said card is removed from said cradle to effectuate a transaction at a terminal that is of sufficient size as to only power said volatile storage unit for a limited period of time and no longer;

providing parasitic power to recharge said rechargeable power source from said terminal when said card is presented to said terminal;

providing a primary power source associated with said cradle for charging said rechargeable power source when said card is repositioned in said cradle; and providing a rapid zeroization of said volatile storage unit after a select period of time has elapsed between removal of said card from said cradle without engaging said card in a transaction providing a lasered read-only memory (ROM) identification block coupled to said controller for identifying said card when presented to said card cradle for storage.

25. A system, comprising:

a card device for effectuating a transaction when presented to a transaction terminal, said card device including a SRAM memory and a rechargeable energy source, said rechargeable source for powering said memory for only a short period of time;

a card cradle carrier for storing said card device when said card device is not engaged in said transaction, said card cradle carrier formed of a substantially rigid material and forming at least a portion of a personal effect, wherein said card cradle carrier includes a second energy source for recharging said first energy source when said card device is received for storage by said card cradle carrier;

means for rapidly zeroization of said SRAM unit after a select period of time has elapsed between removal of said card from said cradle without engaging said card in a transaction and a lasered read-only memory (ROM) identification block coupled to said controller for identifying said card when presented to said card cradle for storage.

* * * * *